Feb. 13, 1923.

E. W. KUMMER.
BERRY BUSH COVERING MACHINE.
FILED FEB. 13, 1922.

1,444,971.

Inventor
Ernest W. Kummer
By A. J. C. O'Brien
Attorney

Patented Feb. 13, 1923.

1,444,971

UNITED STATES PATENT OFFICE.

ERNEST W. KUMMER, OF EDGEWATER, COLORADO.

BERRY-BUSH-COVERING MACHINE.

Application filed February 13, 1922. Serial No. 536,251.

*To all whom it may concern:*

Be it known that I, ERNEST W. KUMMER, a citizen of the United States, residing at the city and county of Edgewater and State of Colorado, have invented certain new and useful Improvements in Berry-Bush-Covering Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a machine for covering berry bushes and similar shrubs in order to protect them from the winter frost.

Gardeners and others who live in the part of the country where the winters are severe have found that it is necessary to protect berry bushes, grape vines and similar fruit bearing shrubs and vines from the frost and they have found that the cheapest and most effective way is to lay them down on the ground surface and then cover them with dirt: this entails a large amount of labor and involves considerable expense.

It is the object of this invention to provide a machine that can be drawn by a team of horses and which will gradually bend the bushes over and lay them flat on the ground after which it will automatically cover them with dirt.

Figure 1:
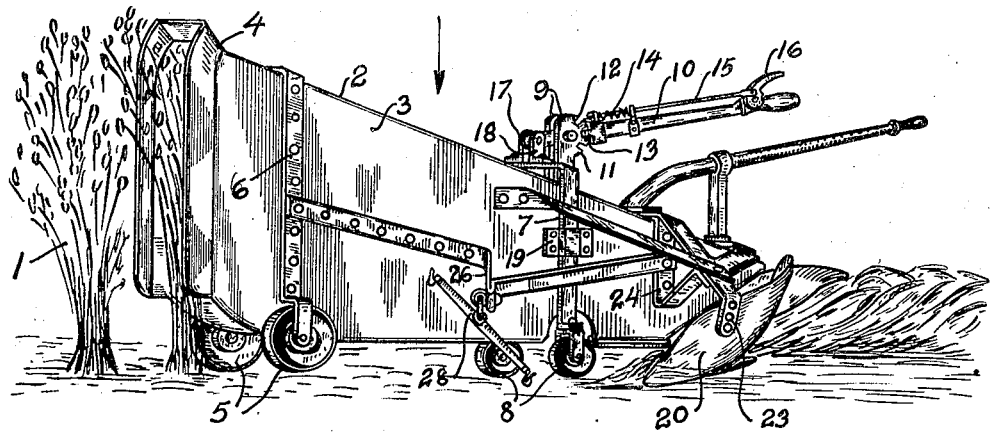
Figure 2:
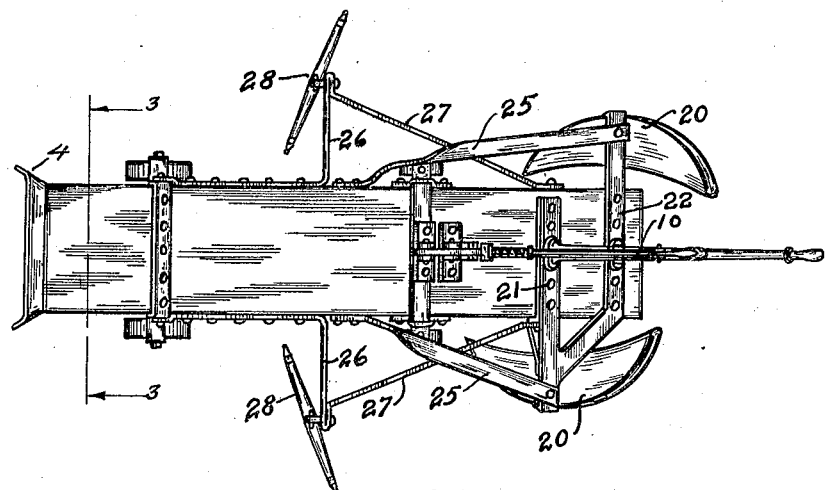
Figure 3:
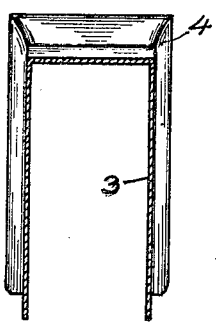

In order to more clearly describe my invention I shall have reference to the accompanying drawing in which Fig. 1 shows a side elevation of my machine in operation Fig. 2 shows a top plan view thereof and Fig. 3 is a section taken on line 3—3 Fig. 2.

The same reference numerals will be used to indicate the same parts in the several views.

Numeral 1 represents a row of berry bushes that are to be laid down and covered with ground and 2 represents my improved machine for performing the desired operation. My machine comprises a metal member 3 of considerable length which has three sides bent into a U-shape as indicated in Fig. 3. Member 3 is rearwardly tapering and its front end is of a height nearly equal to that of the bushes and has outwardly flared edges 4. the purpose of which is to enable the bushes to be more readily gathered together and directs them into the member 3. The rear end of member 3 is considerably lower than the front end with the result that as the member is pulled along the row, the bushes are gradually bent until they lie almost flat upon the ground surface.

Secured to the front end are two wheels 5 which are pivoted to the lower ends of a U-shaped yoke made of a metal bar 6 which is securely riveted to the sides and top of the member.

At the rear of the member 3 I provide another U-shaped yoke which consists of a bar 7, and to the lower ends of which are pivotally connected wheels 8. On top of the member 3, near the rear end thereof I provide a pair of brackets 9, between which is pivotally mounted a lever 10. One of the brackets 10 has an arcuate portion 11 which is provided with a plurality of notches 12 for the reception of a pawl 13, which is slidably connected to the lever 10 and biased towards the arcuate portion 10 by means of a spring 14. A rod 15 leads from the detent 13 to the hand grip 16 by means of which it may be withdrawn from notches 12. The front end 17 of the lever 10 is pivotally connected to a pair of brackets 18 which in turn are secured to the top of the U-shaped yoke member 7, the sides of which are slidable in the straps 19. It is evident that by raising the end of lever 10 I may raise the rear end of member 3 from the ground for transportation, or for the purpose of adjusting the depth to which the plows 20 may penetrate the ground.

Secured to the rear end of member 3 are two plows 20, one of which is located on each side and both of which are so arranged that they will throw the dirt inwardly, one being a right and the other a left hand plow. These plows are securely and rigidly fastened to the end of member 3 by means of bars 21 and 22 whose ends are attached to the plows 20 by bolts or rivets 23: braces 24 serve to prevent the bars from bending upwardly or downwardly and braces 25 serve to take up the force necessary to pull the plows through the ground. I contemplate hitching a horse to each side of my machine and for this purpose I provide outwardly extending brackets 26 to the ends of which I secure diagonal braces 27 and swingletrees 28, to which the horses are hitched.

The operation of my device is as follows: I start at one end of a row and by means of a pair of horses hitched to my machine in the manner above described, the machine is pulled along, the bushes are bent over and downward until they lie almost flat on the ground and are held in this position while the plows 20 deposit dirt over them: the dirt will hold them in place and prevent injury from frost.

Having now described my invention, what I claim is:

A machine for covering berry bushes comprising in combination an elongated body member having a substantially U-shaped cross section, the closed end of which is at the top, the top of said member being downwardly inclined from front to rear and a pair of plows rigidly connected to the rear end thereof, one plow being a left hand and the other a right hand and means for adjusting the depth to which the plows operate.

In testimony whereof I affix my signature.

ERNEST W. KUMMER.